Figure 1:
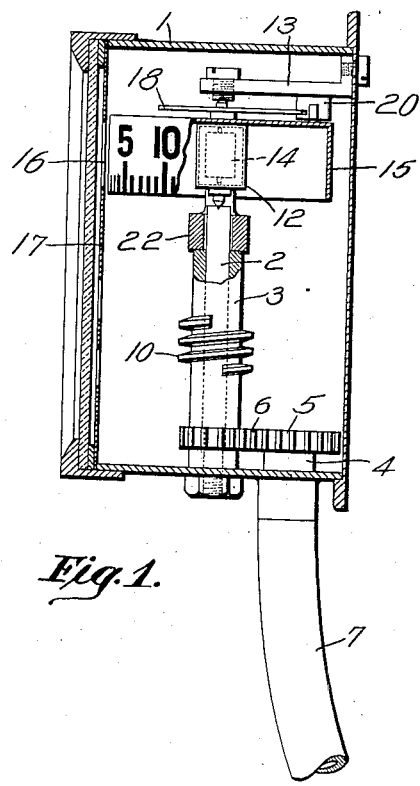

C. G. SMITH.
SPEEDOMETER.
APPLICATION FILED JUNE 11, 1917.

1,271,092.

Patented July 2, 1918.

Inventor,
Charles G. Smith
by Van Everen, Fish & Hildreth
Attys.

UNITED STATES PATENT OFFICE.

CHARLES G. SMITH, OF CAMBRIDGE, MASSACHUSETTS, ASSIGNOR OF ONE-HALF TO CHARLES F. MacGILL, OF CAMBRIDGE, MASSACHUSETTS.

SPEEDOMETER.

1,271,092.  Specification of Letters Patent.  Patented July 2, 1918.

Application filed June 11, 1917. Serial No. 173,890.

*To all whom it may concern:*

Be it known that I, CHARLES G. SMITH, a citizen of the United States, residing at Cambridge, in the county of Middlesex and State of Massachusetts, have invented certain new and useful Improvements in Speedometers; and I do hereby declare the following to be a full, clear, and exact description of the invention, such as will enable others skilled in the art to which it appertains to make and use the same.

The present invention relates to speed indicating devices, and more particularly to speedometers especially adapted for use in connection with motor cars.

Various types of speedometers have been designed for indicating the speed of a motor car at any given instant, which may be divided into three general classes, consisting respectively of the magnetic type, the centrifugal type, and the viscosity type. Of these three types the last is the simplest, and also the most accurate, owing to the fact that the torque exerted upon the indicating member is almost exactly proportional to the speed of the driving member. Constructions of this type as heretofore devised have been objectionable, however, owing to the leakage of fluid from the container during the continued use of the instrument.

The object of the present invention is to provide a speedometer operating upon the viscosity principle, and having all of the advantages incident thereto, while obviating the disadvantages attendant upon the leakage of oil from the container.

With this object in view, a feature of the present invention contemplates the provision of a speedometer casing, a hermetically sealed fluid containing member journaled for rotary movement within the casing, a second member journaled within the containing member for rotation about the same axis, and a magnet supported co-axially with the two members and constructed and arranged to move with the inner member.

In the simplest and most efficient form of the invention which has yet been devised, a sealed fluid containing member is connected to an indicator, and is normally contained in a zero position by a suitable spring. An inner member is journaled within the containing member, co-axially therewith, and is rotated at the speed of the driving shaft by a magnet connected to the driving shaft an supported for rotary movement adjacent the periphery of the fluid containing member. With this construction the rotation of the magnet causes a like rotation of the inner member, which, through the viscosity of the fluid in the container, exerts a certain torque upon the fluid container dependent upon the speed of rotation of the inner member, moving the fluid container and indicator against the tension of the spring.

Still other features of the invention consist in certain novel features of construction, combinations and arrangements of parts hereinafter described and claimed, the advantages of which will be obvious to those skilled in the art, from the following description.

Figure 2:
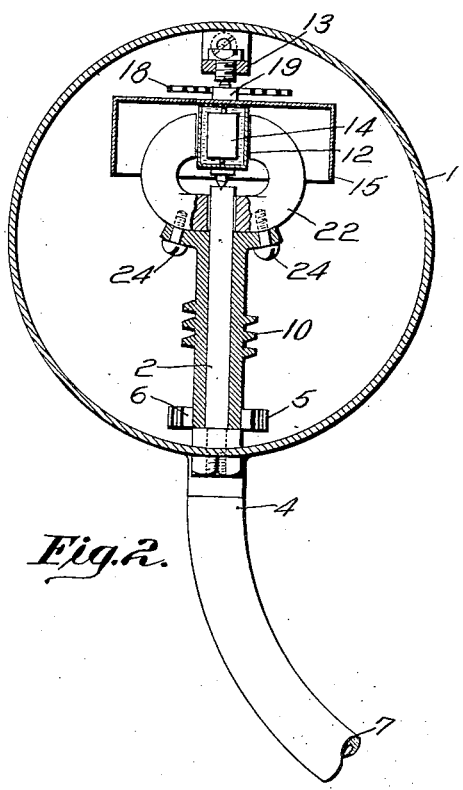
Figure 3:
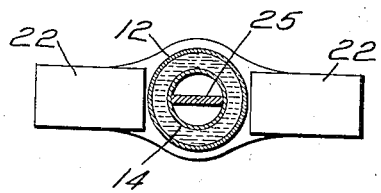

In the accompanying drawings illustrating the preferred form of the invention, Figure 1 represents a longitudinal section, in elevation, of the improved speedometer; Fig. 2 represents a similar section taken at right angles to Fig. 1; and Fig. 3 is a detail illustrating a plan view, partly in section, of the magnet and rotating members.

According to the present invention, a containing member is filled with oil or other suitable fluid, and has received therein a freely rotating cylinder constructed and arranged to be rotated by a magnet supported without the containing member, and connected to the usual driving shaft. The containing member is hermetically sealed, so that all escape of fluid therefrom is eliminated. The rotation of the cylinder within the container exerts a certain drag or torque upon the containing member, owing to the viscosity of the fluid, which tends to rotate the containing member with the inner member. This tendency to rotate upon the part of the containing member is resisted by a spring which normally maintains the container in zero position, so that at any given speed of the inner member the containing member assumes a position in which the torque substantially balances the tension of the spring. By providing a suitable indicator of well known form connected to the container, this torque may be measured in terms of miles per hour, or other suitable indication.

In the illustrated embodiment of the invention, a speedometer casing 1 is provided with a vertical bearing post 2 upon which is journaled a shaft 3 connected with the usual driving shaft 4 through intermeshing gears 5 and 6. The driving shaft is adapted to be connected with the front wheel of an automobile or other rotary member, and is conveniently inclosed in a casing indicated at 7. The mileage recorders (not shown) are operated from the shaft 3 through the worm 10. A fluid containing cylinder 12 is supported in the upper portion of the speedometer casing, and is journaled between bearings formed in the upper face of the bearing post 2 and an arm 13 secured to the speedometer casing. A second cylinder 14 is journaled within the cylinder 12 co-axially therewith, and is adapted to rotate within a suitable fluid contained within the cylinder 12. An indicating cup 15 is secured to the cylinder 12 and is provided with indications upon the periphery which are adapted to show through a sight opening 16 formed in the front wall 17 of the speedometer casing 1. The cylinder 12 and indicator cup are normally maintained in a zero position by a coiled spring 18 secured at opposite ends to the shaft 19 of the cylinder, and to a stationary stud 20 secured to the arm 13.

It is extremely desirable that the fluid containing cylinder 12 shall be sealed in a manner to effectually prevent the leakage of fluid from the cylinder during long-continued operation of the speedometer. To this end a magnet 22 is secured to the upper portion of the shaft 3 through fasteners 24, with the two pole faces located on opposite sides of the cylinder 12, and in close proximity thereto. A cylinder 14 is preferably made of copper or similar material and is provided with a plate 25, of iron or other magnetic material, which maintains a position parallel to the lines of the magnetic field, as shown in Fig. 3. The magnet 22 is ordinarily not rotated at a sufficiently high rate of speed to cause any considerable drag upon the cylinder 12 due to the latter cutting the lines of the magnetic field but in any event the invention contemplates making the cylinder of any suitable non-magnetic material adapted to contain the fluid without being substantially affected by the magnetic drag due to eddy currents generated within itself. It follows, then, that with this construction the magnet 22 is connected to the cylinder 14 through a magnetic clutch to cause a rotation of the cylinder with the magnet, the cylinder in turn exerting a certain drag upon the fluid cylinder 12 through the viscosity of the fluid contained therein. From an inspection of Fig. 2, it will be noted that the air gap between the faces of the plate 25 and the pole faces of the magnet 22 is comparatively small, so that the magnet is able to exert a powerful drag upon the cylinder 14, causing the magnet and cylinder in effect to rotate as one. It will be noted from an inspection of Fig. 2 that the magnet 22 and the two cylinders 12 and 14 are all journaled for rotation about the same axis.

With this construction, an extremely accurate means for indicating the speed of the driving shaft is provided. The construction is simple and compact, comprising substantially only the three parts rotating about a common axis, and the liability of the instrument getting out of order, owing to leakage of fluid or other causes, is reduced to a minimum.

It is to be understood that the term "hermetically sealed," as employed throughout the specification and claims, is intended to specify a permanently sealed member as distinguished from a member, for example, through which a rotating shaft or other member passes.

While it is preferred to employ the specific construction and arrangement of parts shown and described, it is understood that this construction and arrangement is not essential except so far as specified in the claims, and may be changed or modified without departing from the broader features of the invention.

The invention having been described, what is claimed is:—

1. A speedometer, having, in combination, a casing, a hermetically sealed fluid containing member journaled for rotary movement within the casing, a second member journaled within the containing member for rotation about the same axis and having a portion of magnetic material, and a magnet supported coaxially with the two members and constructed and arranged to move with the inner member.

2. A speedometer, having, in combination, a sealed fluid containing member of non-magnetic material journaled for rotary movement, a second member journaled within the containing member for rotation about the same axis and having a portion of magnetic material, a magnet supported coaxially with the two members and constructed and arranged to cause the inner member to move therewith, and a driving shaft connected to the magnet to cause rotation of the latter.

3. A speedometer, having, in combination, a casing, a sealed fluid containing member journaled for rotary movement within the casing, an indicator secured to the container, a spring for normally retaining the indicator in zero position, a second member journaled within the containing member for rotation about the same axis and having a portion of magnetic material, a drive shaft and a magnet connected to the drive shaft and having pole faces positioned at opposite sides of the inner member to cause the latter to rotate with the magnet.

4. A speedometer, having, in combination, a casing, a sealed fluid containing cylinder of non-magnetic material journaled for rotary movement within the casing, a second cylinder journaled within the fluid cylinder for rotation about the same axis, a plate of magnetic material within the second cylinder, a drive shaft and a magnet connected to the drive shaft and having its opposite pole faces positioned in close proximity to the fluid cylinder, and constructed and arranged to cause the inner cylinder to rotate with the magnet.

CHARLES G. SMITH.